United States Patent
Oshiro

(10) Patent No.: US 11,614,084 B2
(45) Date of Patent: Mar. 28, 2023

(54) GAS COMPRESSOR

(71) Applicant: Hitachi Industrial Equipment Systems Co., Ltd., Tokyo (JP)

(72) Inventor: Ryusuke Oshiro, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 839 days.

(21) Appl. No.: 16/496,109

(22) PCT Filed: Jan. 30, 2018

(86) PCT No.: PCT/JP2018/002844
§ 371 (c)(1),
(2) Date: Sep. 20, 2019

(87) PCT Pub. No.: WO2018/179789
PCT Pub. Date: Oct. 4, 2018

(65) Prior Publication Data
US 2020/0011324 A1    Jan. 9, 2020

(30) Foreign Application Priority Data
Mar. 31, 2017 (JP) .............................. JP2017-069584

(51) Int. Cl.
*F04B 49/02* (2006.01)
*F04C 28/06* (2006.01)
(Continued)

(52) U.S. Cl.
CPC ............. *F04B 49/02* (2013.01); *F04B 49/20* (2013.01); *F04C 28/06* (2013.01); *F04C 28/08* (2013.01);
(Continued)

(58) Field of Classification Search
CPC ...... F04B 49/02; F04B 49/20; F04B 2205/11; F04C 28/06; F04C 28/08; F04C 28/28; F04C 2270/195
See application file for complete search history.

(56) References Cited

U.S. PATENT DOCUMENTS

| | | | | |
|---|---|---|---|---|
| 4,142,499 A | * | 3/1979 | Salzgeber | ............... F02D 1/025 123/364 |
| 4,358,247 A | * | 11/1982 | Suzuki | .................... F04C 28/26 417/295 |

(Continued)

FOREIGN PATENT DOCUMENTS

| DE | 10 2013 102 879 A1 | 9/2014 |
|---|---|---|
| EP | 1 978 254 A1 | 10/2008 |

(Continued)

OTHER PUBLICATIONS

Machine Translation of JP 2008-144703.*
(Continued)

*Primary Examiner* — Christopher S Bobish
(74) *Attorney, Agent, or Firm* — Crowell & Moring LLP

(57) ABSTRACT

To prevent generation of drain reliably without depending on a difference in ambient temperature where a compressor is installed. Provided is a gas compressor: having a compressor main body compressing a gas, a drive source driving the compressor main body, a controller controlling the rotation speed of the drive source according to the discharge pressure of the compressor main body, and a temperature detector detecting the temperature of a discharge gas of the compressor main body; and performing no-load operation with the rotation speed of the drive source as a lower limit rotation speed when the discharge pressure reaches an upper limit pressure higher than a set pressure. When detecting that the temperature detected by the temperature detector is equal to or lower than a predetermined temperature during the (Continued)

no-load operation, the controller causes the lower limit rotation speed of the drive source to a lower limit rotation speed at which the temperature of the discharge gas is higher than the predetermined temperature and which is higher than a lower limit rotation speed when the detected temperature is higher than the predetermined temperature.

11 Claims, 3 Drawing Sheets

(51) Int. Cl.
    *F04C 28/08*     (2006.01)
    *F04C 28/28*     (2006.01)
    *F04B 49/20*     (2006.01)

(52) U.S. Cl.
    CPC ........... *F04C 28/28* (2013.01); *F04B 2205/11* (2013.01); *F04C 2240/81* (2013.01); *F04C 2270/195* (2013.01)

(56) References Cited

U.S. PATENT DOCUMENTS

| | | | | |
|---|---|---|---|---|
| 4,529,363 | A | | 7/1985 | Suzuki |
| 5,082,427 | A | * | 1/1992 | Fujiwara ............... F04C 29/042 |
| | | | | 417/310 |
| 6,085,723 | A | * | 7/2000 | Pels ......................... F02B 75/06 |
| | | | | 123/192.1 |
| 8,226,378 | B2 | * | 7/2012 | Daniels ................... F04C 18/16 |
| | | | | 700/282 |
| 9,057,374 | B2 | * | 6/2015 | Fujimoto ................ F04C 29/04 |
| 11,073,148 | B2 | * | 7/2021 | Coeckelbergs ....... F04B 49/065 |
| 11,092,156 | B2 | * | 8/2021 | Moens ................ F04C 29/0014 |
| 2013/0156548 | A1 | * | 6/2013 | Takano ................ F25B 31/004 |
| | | | | 415/114 |
| 2019/0338778 | A1 | * | 11/2019 | Hebrard .................. F04C 28/08 |

FOREIGN PATENT DOCUMENTS

| | | |
|---|---|---|
| EP | 2 578 880 A1 | 4/2013 |
| EP | 2 949 939 A1 | 12/2015 |
| JP | 57-97088 A | 6/1982 |
| JP | 2-238185 A | 9/1990 |
| JP | 4-43893 A | 2/1992 |
| JP | 2005-16414 A | 1/2005 |
| JP | 2005-69100 A | 3/2005 |
| JP | 2008-144703 A | 6/2008 |
| WO | WO 02/46617 A1 | 6/2002 |
| WO | WO 2008/042358 A1 | 4/2008 |

OTHER PUBLICATIONS

International Preliminary Report on Patentability (PCT/IB/373) issued in PCT Application No. PCT/JP2018/002844 dated Oct. 1, 2019, including English translation of document C2 (Japanese-language Written Opinion (PCT/ISA/237 previously filed on Sep. 20, 2019)) (seven (7) pages).
International Search Report (PCT/ISA/210) issued in PCT Application No. PCT/JP2018/002844 dated May 15, 2018 with English translation (two (2) pages).
Japanese-language Written Opinion (PCT/ISA/237) issued in PCT Application No. PCT/JP2018/002844 dated May 15, 2018 (four (4) pages).
Extended European Search Report issued in European Application No. 18775156.5 dated Aug. 25, 2020 (11 pages).

* cited by examiner

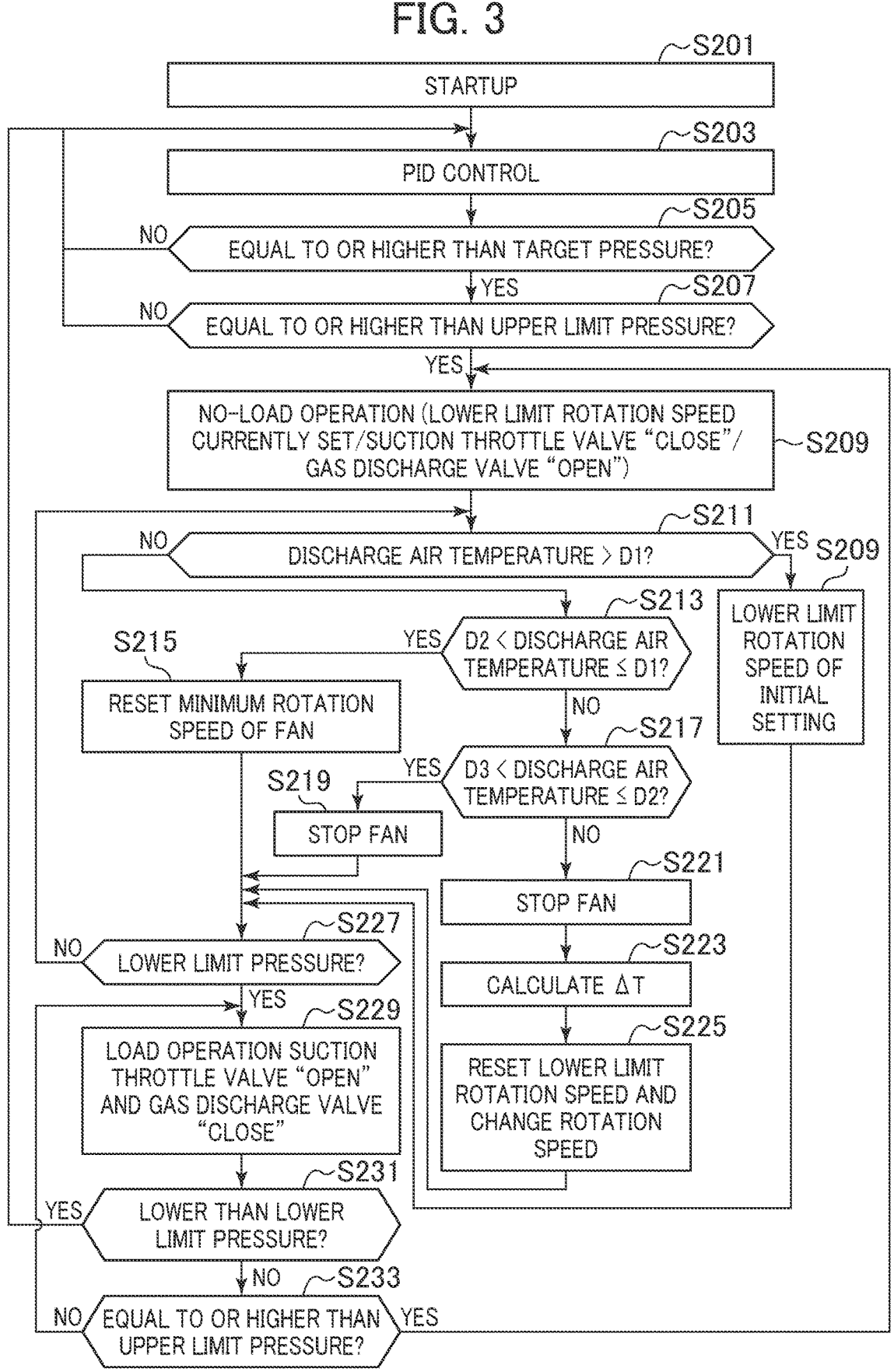

GAS COMPRESSOR

TECHNICAL FIELD

The present invention relates to a gas compressor, and particularly to a gas compressor that performs variable speed control by inverter control.

BACKGROUND ART

In a gas compressor which applies variable speed control to the drive speed of a drive source (for example, a motor) using a rotation speed controller (for example, a power converter/inverter), it is known that when the usage of compressed gas decreases and the pressure thereof exceeds the predetermined pressure desired by the user, control of so-called no-load operation (unload operation) is performed to lighten the load and reduce the rotation speed of the drive source that drives the compressor main body.

For example, Patent Document 1 discloses examples of no-load operations for reducing power consumption in a compressor that performs variable speed control by PID control according to the discharge pressure value of a compressor main body using a motor of power converter control or the temperature of discharged compression air corresponding to the pressure value, by closing the suction throttle valve to reduce the amount of intake air, or releasing compressed air to the atmosphere etc. from a piping route downstream of the compressor main body to lighten the power load of the compressor main body, and reducing the rotation speed of the drive source to a predetermined lower limit speed, when the usage of compressed air decreases and the pressure thereof reaches a predetermined pressure higher than the target pressure desired by the user.

Further, Patent Document 1 discloses that the motor is driven to rotate at a maximum lower limit rotation speed as a lower limit rotation speed during normal PID control operation and to rotate at a minimum lower limit rotation speed as a lower limit rotation speed during no-load operation by allowing the lower limit rotation speed of the drive source during the abovementioned no-load operation to have a range of rotation speed difference between the maximum lower limit rotation speed and the minimum lower limit rotation speed. In other words, in general, because the rated specifications of the motor etc. are set lower than the limit rotation speed for reasons of maintenance etc., strictly speaking, even if the motor is driven at the rated maximum rotation speed, a margin of power further increasing the rotation speed still remains. Patent document 1 discloses that the rise time of compressed air generation is shortened and the followability to pressure fluctuation is improved by driving a motor at a rotation speed higher than the rated maximum rotation speed at the time of initial filling of compressed air or the like such as immediately after startup of the compressor, or by operating at the lower limit rotation speed as the maximum lower limit rotation speed higher than the minimum lower limit rotation speed of no-load operation at the normal PID control operation time except the no-load operation time.

PRIOR ART DOCUMENT

Patent Document

Patent Document 1: JP-2005-69100-A

SUMMARY OF THE INVENTION

Problems to be Solved by the Invention

By the way, since the compressed gas is heated to a high temperature by the compression action, the gas compressor generally has a cooling mechanism such that the temperature of the compressed gas becomes appropriate before the compressed gas is supplied to the user side. As a cooling mechanism, it is also known to provide an air cooler by cooling air using a heat exchanger. In the case of a liquid supply type compressor performing compression while supplying a liquid such as oil or water to the compression operation chamber, a cooler for liquid supply may also be provided in addition thereto. In the compression operation chamber, the heat exchange is performed in the process in which the gas is compressed together with the liquid, which contributes to the cooling of the discharged compression gas.

As described above, although the discharged compression gas is provided to the user in a cooled state, a drain is generated if the high pressure gas is overcooled. Therefore, it is preferable that cooling by the abovementioned heat exchanger or by a liquid such as oil or water is performed such that the discharged gas temperature is higher than the limit temperature that generates the drain, but the discharge temperature of the compressed gas also fluctuates depending on the temperature of the gas inhaled by the compressor main body. For example, in an environment such as a cold district, where the ambient temperature at the installation site of the compressor is low, the discharge gas temperature is also lower because the suction gas temperature is lower. When the operation setting of the cooling mechanism of the compressor is set based on the temperature of the normal temperature environment where the ambient temperature is higher, there is a risk of overcooling up to the drain generation limit temperature if the cooling mechanism is operated in accordance with the operation setting for the normal temperature environment even though the temperature of the discharged compression gas is lowered. Such a risk tends to appear at the time of low rotation speed operation where the temperature of the discharged compression gas becomes relatively low.

In response to such an event, the operation setting of the cooling mechanism can be reset successively in accordance with the temperature of the surrounding environment where the compressor is installed, but there remains a problem in work efficiency, and further there is also the problem of having to constantly cope with irregularly changing ambient temperatures at every moment.

There is a need for a technique that reliably prevents the generation of drains without depending on the difference in ambient temperature.

Means for Solving the Problems

In order to solve the problems described above, for example, the configuration described in the claims is applied. In other words, in a gas compressor: having a compressor main body that compresses a gas, a drive source that drives the compressor main body, a controller that controls a rotation speed of the drive source in accordance with the discharge pressure of the compressor main body, and a temperature detector for detecting a temperature of the discharge gas of the compressor main body; and performing no-load operation with the rotation speed of the drive source as a lower limit rotation speed when the discharge pressure reaches an upper limit pressure higher than a set pressure, and when detecting that the temperature detected by the temperature detector is equal to or lower than a predetermined temperature during the no-load operation, the controller causes the lower limit rotation speed of the drive source to be a lower limit rotation speed at which the temperature of the discharge gas is higher than the predetermined temperature, the lower limit rotation speed being higher than a lower limit rotation speed at which the detected temperature is higher than the predetermined temperature.

Furthermore, in a gas compressor: having a compressor main body that compresses a gas, a cooling mechanism that cools a discharged compression gas of the compressor main body, a drive source that drives the compressor main body, a controller that controls a rotation speed of the drive source according to a discharge pressure of the compressor main body and also controls operation of the cooling mechanism, and a temperature detector that detects a temperature of a discharge gas of the compressor main body; and performing no-load operation setting the rotation speed of the drive source to a lower limit rotation speed when the discharge pressure reaches an upper limit pressure higher than a set pressure, and when detecting that the temperature detected by the temperature detector is equal to or lower than a predetermined temperature during the no-load operation, the controller restricts the operation of the cooling mechanism more than when the detected temperature is higher than the predetermined temperature and controls the operation of the cooling mechanism such that the temperature of the discharge gas is higher than the predetermined temperature.

Advantages of the Invention

According to the present invention, the generation of drain can be dynamically prevented independently of the ambient temperature at the time of no-load operation in which the discharge temperature is relatively low.

Further problems, configurations and effects of the present invention will become apparent from the following description.

BRIEF DESCRIPTION OF THE DRAWINGS

FIG. 3 is a flowchart showing a flow of processing of an air compressor according to a second embodiment to which the present invention is applied.

MODES FOR CARRYING OUT THE INVENTION

Hereinafter, embodiments for carrying out the present invention will be described in detail with reference to the drawings.

Embodiment 1

Figure 1:
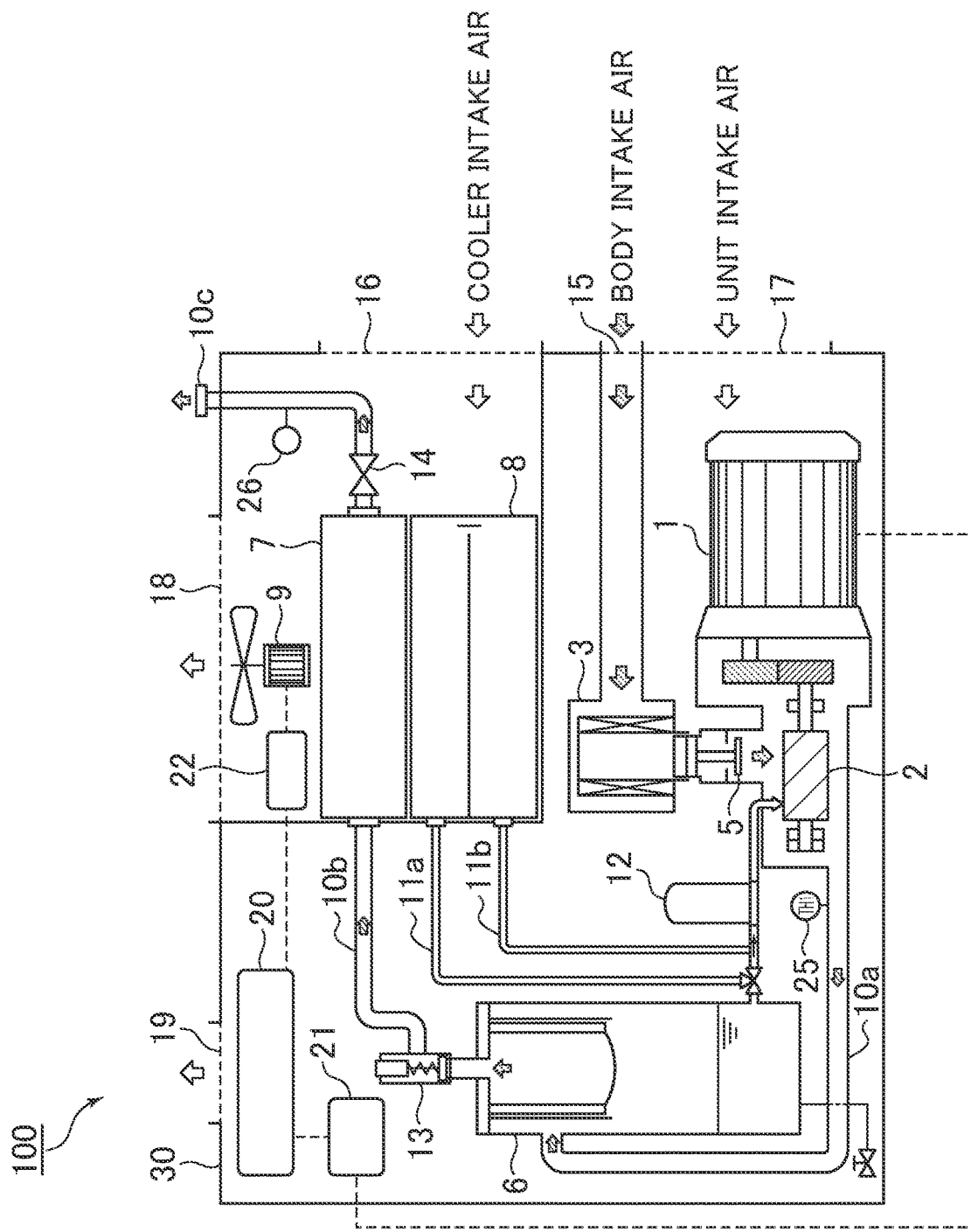
FIG. 1 is a block diagram schematically showing a configuration of an air compressor according to a first embodiment to which the present invention is applied.
Figure 2:
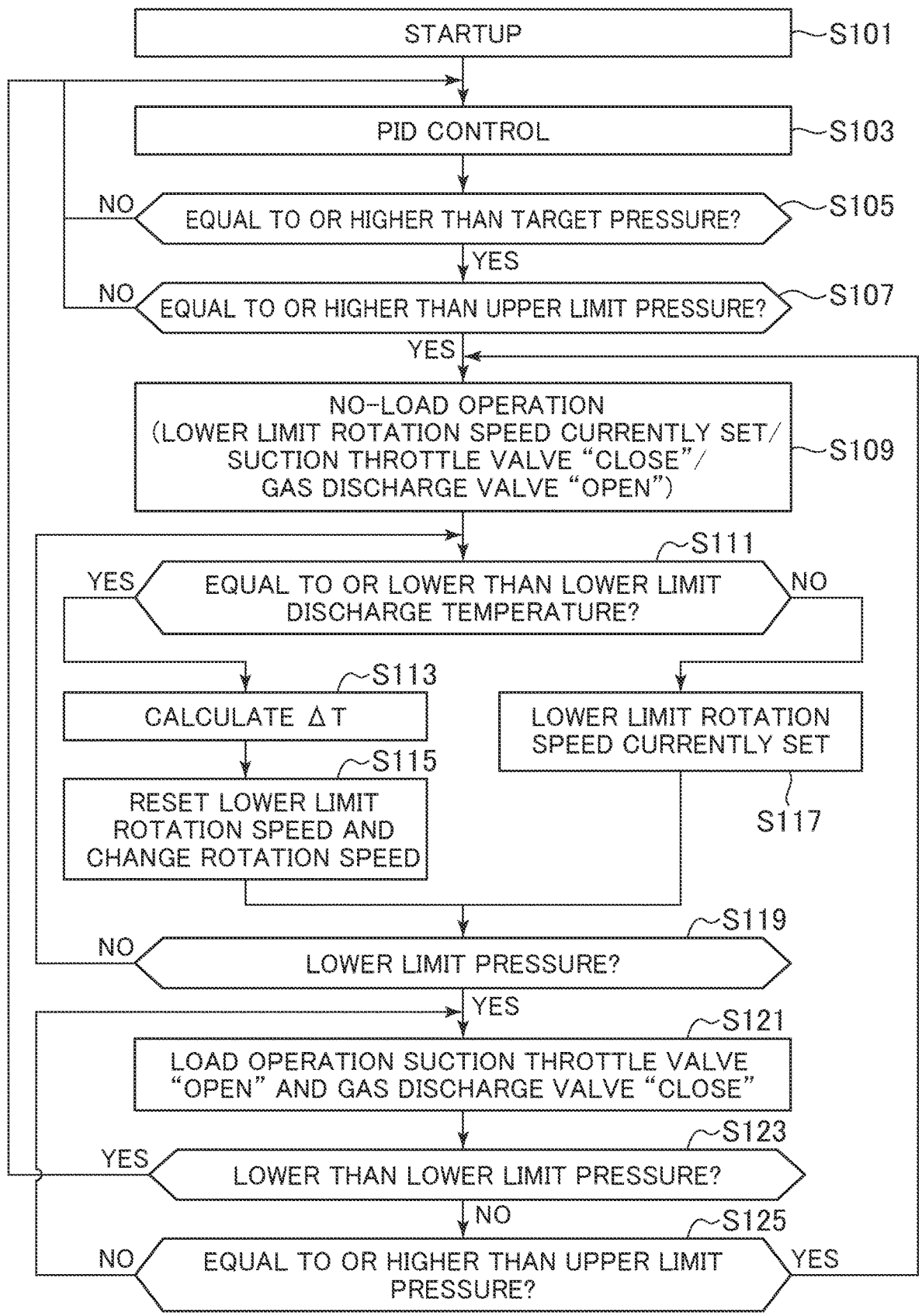
FIG. 2 is a flowchart showing a flow of processing of the air compressor according to the first embodiment.

FIG. 1 schematically shows the configuration of an air compressor 100 (hereinafter referred to as "compressor 100") according to a first embodiment to which the present invention is applied. In the present embodiment, air is used as the compressed gas, but the embodiment is not limited thereto and other gases may be used. The compressor 100 is a liquid-supply-type positive-displacement compressor that supplies liquid (oil) to the compression operation chamber, and it is assumed that an oil-supply-type screw compressor is applied in the present embodiment. The present invention is not limited thereto, and may be of a turbo type.

The compressor 100 is provided with a motor 1 as a drive source, an inverter 21 for changing the frequency of the power supplied thereto, a compressor main body 2 having a screw rotor, a gas-liquid separator 6 for separating the compressed air and lubricating oil discharged from the compressor main body 2, a heat exchanger 7 for cooling the compressed air, a heat exchanger 8 for cooling lubricating oil, a fan 9 for generating cooling air which exchanges heat with these heat exchangers, and a controller 20 for conducting various types of control.

In addition, the compressor 100 includes a temperature detector (for example, a temperature sensor or a thermistor) 25 that detects the temperature of the mixed compression air discharged from the compressor main body and that is disposed in the middle of a discharge line 10a, and a pressure detector 26 (for example, a pressure sensor) that detects the pressure of the discharged compression air and that is disposed in the middle of a discharge line 10c, and the detected values thereof are transmitted to the controller 20. The temperature detector 25 may be disposed on a discharge line 10b.

The compressor main body 2 is provided with a suction throttle valve 5 for controlling an intake amount on the suction side, and inhales external air from an intake path 15 via an air filter 3 by rotational drive of a screw etc. and discharges the mixed compressed air of lubricating oil and air to the gas-liquid separator 6 via the discharge line 10a. The gas-liquid separator 6 separates the lubricating oil and the compressed air by centrifugal force or collision. Thereafter, the compressed air flows to the heat exchanger 7 via a pressure regulating check valve 13 and the discharge line 10b located downstream, and is cooled to a predetermined temperature (for example, approximately 70° C.) lower than the temperature at the time of discharge from the compressor main body (for example, approximately 110° C.) by heat exchange with cooling air in the heat exchanger 7, and then supplied to the user side of the compressed air through the discharge line 10c. On the other hand, the lubricating oil separated by the gas-liquid separator 6 flows to the heat exchanger 8 through an oil line 11a, where the oil is cooled by heat exchange with cooling air, and is returned to the compressor main body 2 through an oil line 11b and an oil filter 12.

The fan 9 for generating the cooling air includes a fan and a motor, and the rotation speed is controlled to be variable by a fan inverter 22 in accordance with a control command from the controller 20. To be more specific, in consideration of the detected temperature of the temperature detector 25 and the heat exchange performance of the heat exchangers 7 and 8, the fan is designed to be rotated at a necessary rotation speed such that the temperature of the discharge air provided to the user side becomes a predetermined temperature. Further, in the present embodiment, the compressor main body and other elements are packaged in a housing 30. Therefore, the fan 9 also generates the cooling air necessary for cooling the motor 1 and the control system, and while the compressor 100 is being driven, the fan always rotates at a rotation speed equal to or higher than the rated minimum rotation speed.

The oil line 11a is branched into two on the downstream side of the heat exchanger 8 via a three-way valve, and one communicates with the heat exchanger 8 and the other communicates with the middle of the oil line 11b. The three-way valve is configured to control the oil flow in the branched oil line 11a to be guided to the heat exchanger 7 side and to the oil line 11b downstream of the heat exchanger 7. For example, when the oil temperature is sufficiently low, the three-way valve prohibits or restricts the flow of oil to the heat exchanger 7 side, and permits the flow to the oil line 11b by the control of the controller 20, thereby controlling the oil temperature.

The controller 20 configures a functional section with the cooperation of a program and a calculator, for example, and performs various types of control of the compressor 100. In the present embodiment, the controller 20 performs variable speed control of the rotation speed of the motor 1 by PID control according to the discharge pressure. To be more specific, the controller 20 monitors the detected value of the pressure detector 26 and controls the rotation speed of the motor 1 to maintain a predetermined target pressure (e.g., 0.70 Mpa) set via an input device (not shown). For example, until it reaches the target pressure, the controller 20 rotates the motor at the rated full speed (full load operation), and after it reaches the target pressure, causes the power to be reduced by increasing or decreasing the rotation speed of the motor 1 in accordance with the pressure fluctuation corresponding to the usage of compressed air. Furthermore, when the usage of compressed air decreases and the pressure detected by the pressure detector 26 reaches a predetermined upper limit pressure (e.g., 0.78 MPa) higher than the target pressure, the controller 20 performs control such that no-load operation is adapted to be performed to further reduce the power.

The no-load operation is an operation controlled in such a manner that when the discharge pressure reaches the upper limit pressure, the rotation speed of the motor 1 is reduced to a predetermined lower limit rotation speed, and then the suction throttle valve 5 is set to "close" to reduce the amount of intake air and an gas relief valve 14 (e.g., solenoid valve) is set to "open" to release compressed air to the atmosphere such that the pressures of the gas-liquid separator 6 and the discharge piping 10a are reduced to lighten the pressure load on the compressor main body 2 and to lessen the power of the motor 1. Thereafter, when the usage of compressed air increases and the discharge pressure falls to a predetermined lower limit pressure in a range of discharge pressure lower than the upper limit pressure and equal to or higher than the target pressure, the controller 20 keeps the lower limit rotation speed of the motor unchanged and switches to the load operation in which the pressure regulating check valve 13 is "close" and the suction throttle valve 5 is "open."

During the load operation, if the discharge pressure is raised again to the upper limit pressure in accordance with the use condition of the compressed air, the controller 20 sets the pressure regulating check valve 13 to "open" and the suction throttle valve 5 to "close" to execute load operation again, and conversely, if the discharge pressure falls below the lower limit pressure during the load operation, the control is returned to PID control.

The operation method of no-load operation is not limited to the present embodiment, and only one of the gas relief valve 14 and the suction throttle valve 5 may be employed in the opening/closing operation thereof, and control may be carried out to operate the motor 1 at the lower limit rotation speed without these types of control, or various methods can be applied.

the controller 20 also controls the cooling mechanism of the fan 9 and the like. For example, when the temperature of the compressed air discharged from the compressor main body 2 to the discharge line 10a at the target pressure is approximately 110° C., the cooling mechanism is controlled such that the temperature of the compressed air flowing through the discharge line 10c is approximately 70° C. to cool the compressed air. To be specific, the controller 20 performs variable speed control of the fan 9 at a predetermined rotation speed according to the temperature detected by the temperature detector 25, through the fan inverter 22. Similarly, the controller 20 controls the flow rate of the lubricating oil flowing to the heat exchanger 8 for heat exchange of the lubricating oil by switching the flow path of the three-way valve on the oil line 11a, and the temperature of the final discharged compression air is adjusted to approximately 70° C.

The temperature of the final discharged compression air is set to approximately 70° C. because the water in the compressed air is extracted as a drain when the air is cooled to a temperature lower than this. In the present embodiment, the minimum temperature at which drain does not occur (or the maximum temperature at which drain occurs) such as 70° C. may be referred to as "drain generation limit temperature."

Here, since the temperature at which the drain is generated is correlated with the pressure of the compressed air, the operation control of the cooling mechanism is generally set based on the case where the compressed air of relatively low pressure is discharged while the compressor main body is driven. Since the discharge pressure is lowest when the compressor main body 2 is driven at the lower limit rotation speed during no-load operation as in the present embodiment, the discharge temperature corresponding to the discharge pressure at this lower limit rotation speed is assumed and the rotation speed of the fan 9 is determined.

However, because the temperature corresponding to the discharge pressure at the lower limit rotation speed is influenced by the temperature of the air taken in by the compressor main body 2, if the intake air temperature is occasionally high or low, relative difference will occur in the discharge air temperature even when the pressure is the same. In the case where the intake air temperature is in the range of 15° C. to 35° C. and in the case where the intake air temperature is 0° C., the discharge temperature may be lower than the drain generation limit temperature when the motor 1 rotates at the lower limit rotation speed even if the fan 9 operates at the rated minimum rotation speed.

Therefore, one of the features in the present embodiment is such that the discharge air temperature of the compressor main body 2 and the drain generation limit temperature are compared for consideration, and when the temperature of the final discharge air to be provided to the user side during no-load operation is lower than the drain generation limit temperature, control is performed such that the lower limit rotation speed of the motor 1 is increased to increase the temperature of the final discharge air to be higher than the drain generation limit temperature.

To be more specific, the "lower limit discharge temperature" is set in advance in a storage device or the like, and the rotation speed of the compressor main body 2 is controlled such that the temperature is equal to or higher than the "lower limit discharge temperature." The "lower limit discharge temperature" refers to the discharge air temperature of the compressor main body 2 in which the final temperature of the discharge air to be provided to the user side becomes a temperature equal to or higher than the drain generation limit temperature. In particular, in consideration of the heat dissipation from the area, the area including from the compressor main body 2 to the discharge piping system, toward the outside of the compressor 100, the "lower limit discharge temperature" is a temperature obtained by adding the temperature corresponding to heat dissipation to the drain generation limit temperature. Furthermore, when the fan 9 etc. are provided, the temperature determined by considering the cooling performance of these cooling mechanisms is "the lower limit discharge temperature." For example, when the drain generation limit temperature at a certain discharge pressure is X° C. and the temperature of the discharge air decreases by 15° C. due to the cooling by the cooling mechanism, the lower limit discharge temperature of the air discharged from the compressor main body 2 is a temperature obtained by adding the drain generation limit temperature X° C. to this temperature 15° C. When the discharge temperature of the compressor main body 2 (the detected value of the temperature detector 25) becomes equal to or lower than the lower limit discharge temperature during no-load operation, the compressor 100 increases the lower limit rotation speed of the motor 1 such that the discharge temperature exceeds the lower limit discharge temperature. As a result, the discharge pressure rises and the discharge temperature also relatively rises, which makes it possible to prevent the drain generation.

From the viewpoint of power reduction, the lower limit rotation speed of the motor 1 set at this time is preferably in such a degree that the detected temperature of the discharge air slightly exceeds the lower limit discharge temperature. In addition, even after the lower limit rotation speed is set as described above, the controller 20 compares the detected value of the temperature detector 25 with the lower limit discharge temperature, and by calculating the lower limit rotation speed of the motor 1 that allows the discharge temperature to be equal to or higher than the lower limit discharge temperature and also in the vicinity thereof and resetting the lower limit rotation speed as appropriate, power is reduced as much as possible while preventing generation of a drain in no-load operation and the like.

FIG. 3 shows an example of the process flow of the controller 20 that performs the above operations.

The controller 20 starts the compressor in S101 and sets the motor 1 to the rated full load operation up to the target pressure by PID control on the basis of the detected value of the pressure detector 26 in S103.

In S105, the controller 20 monitors whether the detected value of the pressure detector 26 is equal to or higher than the target pressure, and when the value is lower than the target pressure (No), the processing returns to S103 and when the value is equal to or higher than the target pressure (Yes), the processing proceeds to S107.

In S107, the controller 20 monitors whether the detected value of the pressure detector 26 is the upper limit pressure, and when the value is lower than the upper limit pressure (No), the processing returns to S103, and when the value is equal to or higher than the upper limit pressure (Yes), the processing proceeds to S109.

In S109, the controller 20 sets the suction throttle valve 5 to "close" and the gas relief valve 14 to "open" while causing the motor 1 to rotate at the currently set lower limit rotation speed and perform no-load operation to reduce the pressure of the discharge system inside the compressor 100. Note that the lower limit rotation speed currently set is either the lower limit rotation speed updated in S115 to be described later or the lower limit rotation speed initially set, and when the updated lower limit rotation speed is set, the motor 1 is driven to rotate at this rotation speed.

In step S111, the controller 20 determines whether the temperature detected by the temperature detector 25 is equal to or lower than the lower limit discharge temperature currently set in the storage device of the controller 20. When the temperature is equal to or lower than the lower limit discharge temperature (Yes), the controller 20 proceeds to S113, and when the temperature is higher than the lower limit discharge temperature (No), the controller 20 proceeds to S117 and causes the motor 1 to rotate at the lower limit rotation speed of the initial setting. The lower limit rotation speed of the initial setting is, for example, the lower limit rotation speed during no-load operation set as an initial value when approximately 15° C. to 40° C. is regarded as a standard ambient temperature. Note that this S111 may be executed after a predetermined period of time has elapsed since the no-load operation starts in S109. It is because since the change in pressure and the discharge temperature are unstable immediately after the start of the no-load operation, the lower limit temperature in the no-load operation can be more accurately determined after waiting for the stabilization of these. The predetermined elapsed period of time is, for example, approximately 30 seconds to approximately 2 minutes.

In step S113, the controller 20 calculates ΔT that is the difference between the detected value of the temperature detector 25 and the lower limit discharge temperature. An increase in the lower limit rotation speed is determined in accordance with the magnitude of this ΔT. In S115, the controller 20 resets the lower limit rotation speed obtained by adding the increasing rotation speed, and makes the storage device store the rotation speed as the lower limit rotation speed currently set, thereby increasing the rotation speed of the motor 1 by using this rotation speed.

In S119, the controller 20 monitors whether or not the usage of compressed air increases and the detected value of the pressure detector 26 lowers and has become the lower limit pressure that triggers switching from no-load operation to load operation. When it reaches the lower limit pressure (No), the controller 20 returns to S111 and continues monitoring whether the discharge air temperature is equal to or less than the drain generation limit temperature. When it reaches the lower limit pressure (S119: Yes), the controller 20 proceeds to S121, and performs a load operation in which the suction throttle valve 5 is "open" and the gas relief valve 14 is "close." If the usage of compressed air is slightly increased, the discharge pressure rises again at this load operation.

In S121 and S125, the controller 20 monitors the fluctuation of the lower limit pressure and the upper limit pressure, and repeats the no-load operation and the load operation or performs the processing of PID control in accordance with these conditions.

The above describes the first embodiment. According to the first embodiment, even when the discharge air temperature of the compressor main body 2 is lower than the lower limit discharge temperature, the generation of drain can be dynamically prevented during no-load operation. In other words, even if the installation environment of the compressor 100 is a low temperature environment, the generation of compressed air and the operation of the compressor can be performed safely without depending on this.

In addition, when the discharge air temperature does not fall below the drain generation limit temperature, the lower limit rotation speed in no-load operation can also be reduced to the extent that drain is not generated, and in this case, power saving operation can be performed more effectively.

In addition, since it is repeatedly monitored whether the lower limit rotation speed needs to be updated during no-load operation, the generation of drain in no-load operation can be prevented dynamically also against daily sudden changes in the ambient temperature or changes due to seasonal factors for example.

As mentioned above, although the first embodiment has been described, the present invention is not limited to the abovementioned embodiment. For example, an example in which the fan 9 always rotates at a rotation speed equal to or higher than the rated minimum rotation speed has been described in the first embodiment but the present invention can be applied to a configuration without the fan 9. In this case, the abovementioned "lower limit discharge temperature" can be regarded as equivalent to the drain generation limit temperature. Further, the lower limit rotation speed of the motor 1 may be determined by a temperature obtained by adding or subtracting a margin of several degrees Celsius to or from the "lower limit discharge temperature."

Embodiment 2

A second embodiment to which the present invention is applied will be described. In the first embodiment, the prevention of drain generation during the no-load operation is eliminated by controlling the lower limit rotation speed of the motor 1, but in the present modification, one of the features thereof is control of the operation of the cooling mechanism such as the fan 9, the control being performed before changing the lower limit rotation speed of the motor 1.

In the second embodiment, the configuration of the compressor 100 is the same as that of the first embodiment, but the configuration of the fan 9 is different. In the first embodiment, the fan 9 is always driven at a rotation speed equal to or higher than the rated minimum rotation speed without stopping during driving of the compressor 100. This is because it is necessary to generate an air flow by the fan 9 in order to take in the cooling air for the motor 1 and the control system from the outside of the housing.

However, when the installation environment is a low temperature environment, for example, cooling for the motor 1 and the control system may not always be necessary. For this reason, control of the fan 9 including stoppage thereof can be performed, and the prevention of drain generation and the reduction of power can be performed more effectively in the second embodiment.

In the compressor 100 of the second embodiment, the controller 20 monitors the temperature of the discharge air from the compressor main body 2 on the basis of the detected value of the temperature detector 25 and the lower limit discharge temperature as in the first embodiment, and further reduces the rated minimum rotation speed of the fan 9 when the discharge air temperature is equal to or lower than the lower limit discharge temperature, thereby reducing the heat exchange performance (cooling performance) of the heat exchangers 7 and 8 for the discharged air and oil. Further, the controller 20 stops the fan 9 when the discharge air temperature exceeds the lower limit discharge temperature even if the rated minimum frequency of the fan 9 is lowered, and if the discharge air temperature still does not exceed the drain generation limit temperature, the controller 20 increases the lower limit rotation speed of the motor 1 as in the first embodiment.

Here, a plurality of different temperatures are set as the lower limit discharge temperature in the second embodiment.

The first lower limit discharge temperature (D1) is a temperature obtained by adding the cooling performance in the case where the speed of the fan 9 is further reduced from the rated minimum rotation speed, to the drain generation limit temperature. For example, assuming that the drain generation limit temperature is X° C., and that the cooling performance of the cooling mechanism at a rotation speed further decreased from the rated minimum rotation speed of the fan 9 brings the temperature reduction of 8° C., D1=X° C.+8° C. is satisfied.

The second lower limit discharge temperature (D2) is determined by taking into consideration the cooling performance of the cooling mechanism when the fan 9 is stopped. For example, when the fan 9 is stopped, the cooling performance by heat exchange with the cooling air cannot be expected, and thus 2° C. to 3° C. of the cooling performance is estimated due to the natural heat dissipation of the heat exchangers 7 and 8 and the like. Thus, for example, D2=X° C.+73° C. is satisfied.

The third lower limit discharge temperature (D3) is a drain generation limit temperature (for example, X° C.).

During no-load operation, if the temperature of air discharged by the compressor main body 2 (detected value of the temperature detector 25) is equal to or lower than D1 and higher than D2, the controller 20 maintains the rotation speed of the initial setting and sets the fan 9 to a predetermined minimum rotation speed lower than the rated minimum rotation speed. Alternatively, if the temperature of the discharge air is equal to or lower than D2 and higher than D3, the controller 20 stops the fan 9 while keeping the motor 1 at the initially set rotation speed. Then, when the discharge temperature is D3 or lower, the controller 20 stops the fan 9 and increases the lower limit rotation speed to conduct operation as in the first embodiment.

FIG. 3 shows the flow of processing according to the second embodiment.

In S201 to S207, the controller 20 drives the motor 1 by PID control based on the discharge pressure until it reaches the upper limit pressure after the startup as in the first embodiment.

When the discharge pressure becomes equal to or higher than the upper limit pressure, the controller 20 starts no-load operation in S209. In other words, if the lower limit rotation speed currently set is stored as the lower limit rotation speed of the motor 1, the rotation speed is applied, and if the lower limit rotation speed currently set is not stored as the lower limit rotation speed of the motor 1, the lower limit rotation speed of initial setting is applied, and then the suction throttle valve 5 is set to "close" and the gas relief valve 14 is set to "open."

In step S211, the controller 20 determines whether the discharge air temperature of the compressor main body 2 is higher than the first lower limit discharge temperature D1 and causes the motor 1 to rotate at the lower limit rotation speed of initial setting (maintains the rotation speed when the rotation speed is set to the initially set lower limit rotation speed in S209) when the discharge air temperature is higher (Yes). When the discharge air temperature is lower (No), the processing proceeds to S213.

In S213, the controller 20 determines whether or not the discharge air temperature of the compressor main body 2 is equal to or lower than the lower limit discharge temperature D1 and higher than D2. When the temperature of the discharged air is in this range (Yes), the controller 20 proceeds to S219 and resets the minimum rotation speed of the fan 9 so as to set the speed to a still lower rotation speed. Conversely, when the lower limit discharge temperature is not in this range (No), the processing proceeds to S217.

If the discharge air temperature of the compressor main body 2 is equal to or lower than the lower limit discharge temperature D2 and higher than D3 in S217 (Yes), the controller 20 proceeds to S219 and stops the fan 9. Conversely, when the discharge air temperature is not in this range (No), the fan 9 is stopped in S211 and the difference ΔT between the discharge air temperature and the lower limit discharge temperature D3 is calculated in S223 as in the first embodiment because the temperature is equal to or lower than the lower limit discharge temperature D3 (equivalent to the drain generation limit temperature).

Then, in S225, the lower limit rotation speed of the motor 1 is reset in the storage device such that the discharge air temperature becomes higher than the lower limit discharge temperature D3 in accordance with the magnitude of ΔT, and the motor 1 is driven at this rotation speed. In addition, it is the same idea as the first embodiment that this reset rotation speed is such a rotation speed that the discharge air temperature becomes higher than and close to the lower limit discharge air temperature D3.

In S227, the controller 20 determines whether the discharge pressure during no-load operation is reduced to the lower limit pressure at which the operation is switched to load operation. When the pressure is the lower limit pressure (Yes), the controller 20 proceeds to S229, and starts load operation with the suction throttle valve 5 "open" and the gas relief valve 14 "close." Thereafter, the controller 20 monitors whether the discharge pressure is lower than the lower limit pressure or equal to or higher than the upper limit pressure in S231 and S233, and executes no-load operation (return to S209) again or PID control operation (return to S203) in accordance with the monitoring result.

As described above, according to the second embodiment, when the discharge temperature during no-load operation is equal to or lower than the lower limit discharge temperature, the rotation speed of the fan 9 is further reduced from the rated minimum rotation speed or the fan 9 is stopped in accordance with the difference between the two temperatures, thereby enabling the prevention of the drain to be generated, in dynamically.

In addition, when the temperature cannot be raised to be higher than the lower limit discharge temperature only by the operation restriction of the fan 9, the lower limit rotation speed control of the motor 1 of the first embodiment can be performed, and methods corresponding to the degree of temperature difference can be selected.

As mentioned above, although the first embodiment and the second embodiment of the present invention have been described, the present invention is not limited to the above-mentioned configurations etc., and a various configurations are applicable in the range which does not deviate from the significance. Some elements of the first embodiment can be applied to the second embodiment and vice versa.

DESCRIPTION OF REFERENCE CHARACTERS

1: Motor
2: Compressor main body
3: Suction filter
5: Suction throttle valve
6: Gas-liquid separator
7: Heat exchanger
8: Heat exchanger
9: Fan
10a, 10b, 10c: Discharge line
11a, 11b: Oil line
12: Oil filter
13: Pressure regulating check valve
14: Gas relief valve
15: Intake port
16: Heat exchanging section intake port
17: Unit intake port
18: Heat exchanging section exhaust port
19: Unit exhaust port
20: Controller
21: Inverter
22: Fan inverter
25: Temperature detector
26: Pressure detector
30: Housing

The invention claimed is:

1. A gas compressor comprising:
a compressor main body that compresses a gas;
a drive source that drives the compressor main body;
a controller that controls a rotation speed of the drive source in accordance with a discharge pressure of the compressor main body;
a temperature detector that detects a temperature of a discharge gas of the compressor main body,
the gas compressor performing no-load operation in which the rotation speed of the drive source is a lower limit rotation speed, when the discharge pressure reaches an upper limit pressure higher than a set pressure, wherein
when detecting that the temperature detected by the temperature detector is equal to or lower than a predetermined temperature during the no-load operation, the controller causes the lower limit rotation speed of the drive source to be a lower limit rotation speed at which the temperature of the discharge gas is higher than the predetermined temperature, the lower limit rotation speed being higher than a lower limit rotation speed at which the detected temperature is higher than the predetermined temperature; and
a cooling mechanism that cools the discharge gas, wherein
the predetermined temperature is a temperature obtained by adding a temperature, by which the cooling mechanism makes a temperature of the discharge gas reduce, to a minimum temperature at which no drain is generated in the discharge gas.

2. The gas compressor according to claim 1, wherein the predetermined temperature is a minimum temperature at which no drain is generated in the discharge gas.

3. The gas compressor according to claim 1, wherein the controller waits to start detection for a predetermined period of time before detecting that the temperature detected by the temperature detector is equal to or lower than the predetermined temperature.

4. The gas compressor according to claim 1, further comprising a suction throttle valve that controls an intake amount of the compressor main body and a gas relief valve disposed in a discharge line of the compressor main body to release the discharge gas, wherein
the controller causes the suction throttle valve to be closed and the gas relief valve to be open during the no-load operation, and
when the discharge pressure of the compressor main body reaches a lower limit pressure which is lower than the upper limit pressure and is equal to or higher than the set pressure, the controller switches to load operation in which the throttle valve is opened and the gas relief valve is closed, at the lower limit rotation speed of the no-load operation.

5. The gas compressor according to claim 1, wherein
a compression type of the compressor main body is either a positive-displacement type or a turbo type.

6. The gas compressor according to claim 1, wherein
a type of the compressor main body is either a liquid supply type or a non-liquid supply type.

7. A gas compressor comprising:
a compressor main body that compresses a gas;
a cooling mechanism that cools a discharged compression gas of the compressor main body;
a drive source that drives the compressor main body;
a controller that controls operation of the cooling mechanism while controlling a rotation speed of the drive source in accordance with a discharge pressure of the compressor main body; and
a temperature detector that detects a temperature of a discharge gas of the compressor main body,
the gas compressor performing no-load operation in which the rotation speed of the drive source is a lower limit rotation speed when the discharge pressure reaches an upper limit pressure higher than a set pressure, wherein
when detecting that the temperature detected by the temperature detector is equal to or lower than a predetermined temperature during the no-load operation, the controller restricts operation of the cooling mechanism more than when the detected temperature is higher than the predetermined temperature and controls the operation of the cooling mechanism such that the temperature of the discharge gas becomes higher than the predetermined temperature, wherein
the predetermined temperature is a temperature obtained by adding a temperature, by which the cooling mechanism makes a temperature of the discharge gas reduce, to a minimum temperature in which no drain is generated in the discharge gas.

8. The gas compressor according to claim 7, wherein
the restriction of the operation of the cooling mechanism by the controller includes stopping the cooling mechanism, and
the controller increases the lower limit rotation speed when the temperature detected by the temperature detector is equal to or lower than the predetermined temperature even when the controller stops the cooling mechanism.

9. The gas compressor according to claim 7, wherein
the cooling mechanism includes a heat exchanger and a fan that generates cooling air exchanging heat with the heat exchanger, a rotation speed of the fan being controlled to be variable and
the restriction of the operation of the cooling mechanism by the controller includes further reducing a minimum rotation speed of the fan.

10. The gas compressor according to claim 7, wherein
a compression type of the compressor main body is either a positive-displacement type or a turbo type.

11. The gas compressor according to claim 7, wherein
a type of the compressor main body is either a liquid supply type or a non-liquid supply type.

* * * * *